United States Patent [19]

Van Der Ende

[11] Patent Number: 5,033,316
[45] Date of Patent: Jul. 23, 1991

[54] DEVICE FOR MEASURING AT LEAST THE TENSILE FORCE IN A WINCH WIRE

[76] Inventor: Andre M. Van Der Ende, No. 31, Botersloot, 4225 PR Noordeloos, Netherlands

[21] Appl. No.: 433,980

[22] Filed: Nov. 8, 1989

[30] Foreign Application Priority Data

Nov. 14, 1988 [NL] Netherlands ................. 8802801

[51] Int. Cl.$^5$ ............................................. G01L 5/04
[52] U.S. Cl. ................................................. 073/862.45
[58] Field of Search ........... 73/862.44, 862.45, 862.47, 73/862.48

[56] References Cited

U.S. PATENT DOCUMENTS

| 2,092,439 | 9/1937 | Bouhuys | 73/862.45 X |
| 2,758,472 | 8/1956 | Bowen, Jr. | 73/862.45 |
| 3,880,001 | 4/1975 | Hogan | 73/862.45 X |
| 4,509,376 | 4/1985 | Thomasson | 73/862.45 X |

FOREIGN PATENT DOCUMENTS

| 0116026 | 8/1984 | European Pat. Off. |
| 2064271 | 7/1972 | Fed. Rep. of Germany |
| 2126323 | 11/1973 | Fed. Rep. of Germany |
| 2430179 | 1/1976 | Fed. Rep. of Germany |

Primary Examiner—Charles A. Ruehl
Attorney, Agent, or Firm—Mark Zovko

[57] ABSTRACT

A device for measuring the tensile force in a winch wire. The apparatus includes a frame and three wheels connected to the frame. The first and third wheels are mounted on a common shaft, and the second wheel is mounted adjacent to the other wheels. A winch wire is trained over the first wheel, along a common tangent with the second wheel, over the second wheel and along a common tangent with the third wheel and thereover the third wheel. Conventional force measuring means can be used to measure the force pulling the first and second wheels together, which is caused by the tensile force in the winch wire. A tachometer is coupled to the common shaft of the first and third wheels, which can be used to measure the length of wire payed out from the device.

9 Claims, 2 Drawing Sheets

DEVICE FOR MEASURING AT LEAST THE TENSILE FORCE IN A WINCH WIRE

The invention relates to a device for measuring the tensile force in a winch wire.

Such a device is used for instance with a wire-line-unit or well winch in order to be able to check the loading of the winch wire during operations. Such a known device is moreover used to measure the paid out length of the winch wire.

The device mentioned is a development of applicant and represents an improvement on the previously known device which makes use of two wheels disposed successively in the lengthwise direction of the winch wire and a third one half-way between these two wheels and above them. The winch wire runs through between these wheels and acquires as a result a small S-shaped path. The force with which the wheels are pressed away from each other by the winch wire is measured and is a measure for the tensile force in the winch wire. The drawback of this device was that wire break occurred quite quickly because, as a consequence of the alternating stress undergone during each passage through the measuring device, material fatigue soon occurred.

With the device described this drawback was obviated and an average ten times longer useful life of the winch wire was achieved.

It was found that this device also has a drawback, namely that the tensile force measurement is insufficiently accurate, and in particular that changes in the tensile force are measured with a delay.

The invention has for its object to improve the device of the type described such that this drawback is eliminated.

After extensive analysis it was found that the cause of the measurement inaccuracy lay in the fact that the wire in the "loop" did not follow the changes in the tensile force in the winch wire.

It was found that the cause of this lay in the following.

An increase in the tensile force in the winch wire is accompanied by a (minimal) lengthening of the wire as a result of elastic stretch. For an increase in the tensile force in the wire in the "loop" a proportional lengthening of this portion of the wire is necessary. The movement over the first wheel of the incoming wire portion relative to the outgoing wire portion is hindered by the friction on this first wheel. When the tensile force changes the corresponding stretch change in the wire in the loop can occur only gradually and after a little time through relative creep of the wire portions over the first wheel. The force measurement is consequently delayed in similar manner.

With the invention the incoming wire portion and the outgoing wire portion can slide freely relative to one another, since they are trained over separate wheels. With the device according to the invention tensile force changes that occur in the winch wire can therefore be measured immediately.

A device of the present kind is likewise used to measure the paid-out length of the winch wire by measuring the revolutions of one of the wheels. The device according to the invention has the additional advantage that this length measurement can take place more accurately since no errors occur as a result of the above mentioned creep.

When all the wheels have the same effective diameter, the advantage is achieved that the wire portions extending between the wheels run parallel to one another. Because of this the resulting forces of the tensile force on the second wheel are in accordance with a simple dependency equal to twice the tensile force. As a result the measurement can be simply processed.

The invention is further elucidated in the following description with reference to a preferred embodiment shown in the figures.

Figure 1:
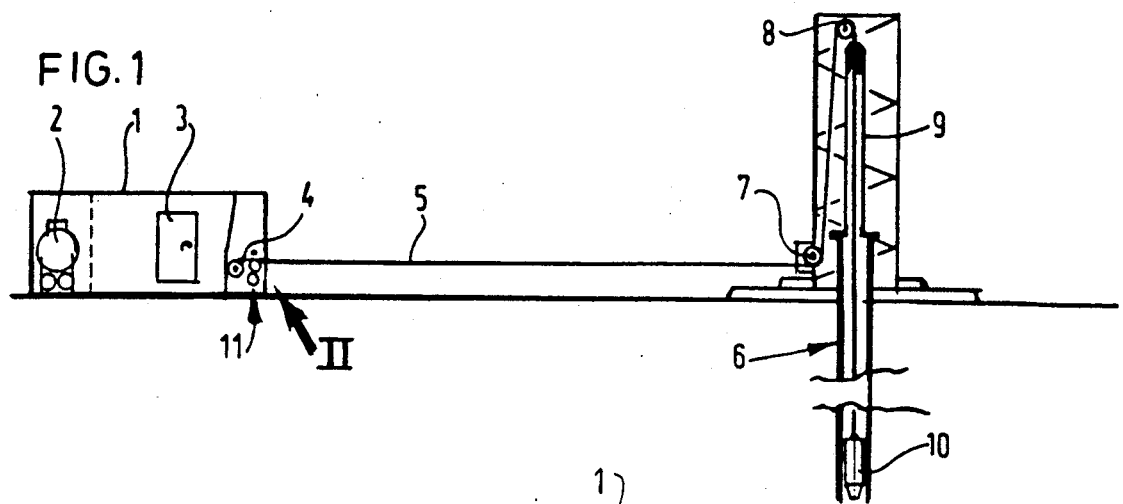
FIG. 1 shows schematically a well winch in operation, whereby the device according to the invention is applied.

The winching device 1 whereby the measuring device according to the invention is employed has an exterior frame in the form of a container that is suitable for transport as a separate, closed unit and also comprises all the equipment necessary for the normal operation of the winch device at a random desired location. Of the winch device only a hydraulic unit 2 and a door 3 of the control cabin are shown in FIG. 1. Visible in FIG. 1 of the device itself is only a winch drum 4 over which runs a winch wire 5. This leads to the interior of a well 6 via a first cable pulley 7 and a second cable pulley 8, this latter being supported at some distance above the well 6 by a post 9. Coupled to the free end of cable 5 situated inside the well 6 is a body 10, the functioning of which inside the well has to be controlled by means of the winch device. For proper operation of the body 10 it is thereby necessary that the tensile force in the winch wire 5 is watched closely as well as the paid-out length of the winch wire. This information is ascertained with the measuring device according to the invention to be described hereinafter.

As the well 6 itself, the accompanying installation 7, 8 and 9 and the body 10 do not form part of the invention either with respect to their form or their operation, the details thereof are not further discussed.

Figure 2:
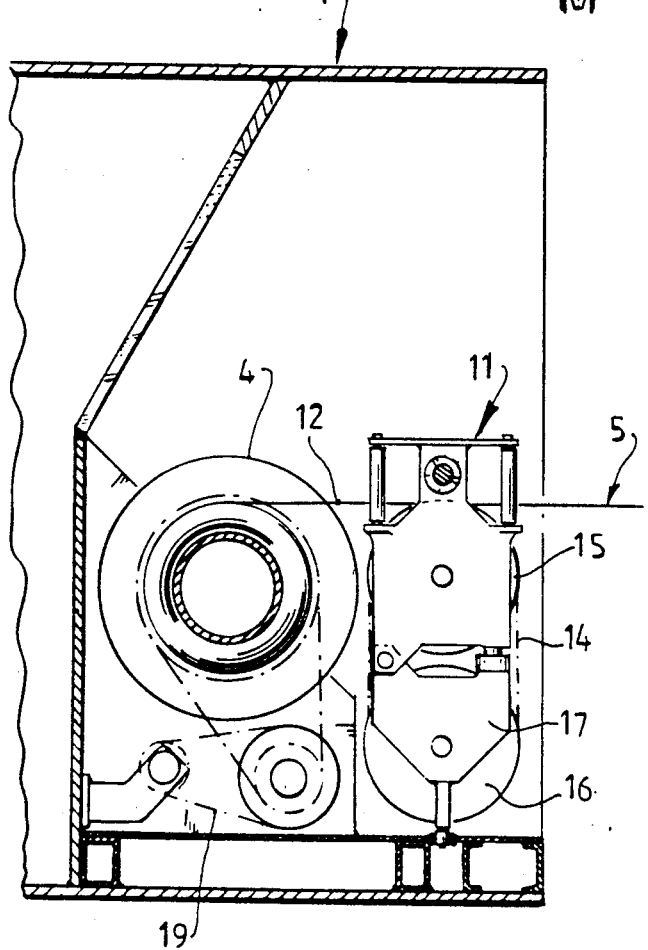
FIG. 2 is an enlarged detail along arrow II in FIG. 1.

As shown in FIG. 2 the measuring device 11 is arranged in front of the winch drum 4 so that the portion 12 of the winch wire 5 coming from the winch drum 4 and running towards the measuring device 11 is trained in a loop 14 about the wheels 15, 16, 18 of the measuring device and leaves the measuring device 11 as the outgoing part 13. The incoming part 12 and the outgoing part 13 can lie in line with one another but can also form a limited mutual angle. The outgoing part 13 can for instance run diagonally upward at an angle of 30°. The winch drum 4 is driven in a manner not further explained by a driving 19 and thereby pays out the winch wire 5 or draws it in. The winch wire 5 thereby remains continually trained in the loop 14 about the wheels of the measuring device 11.

Figure 3:
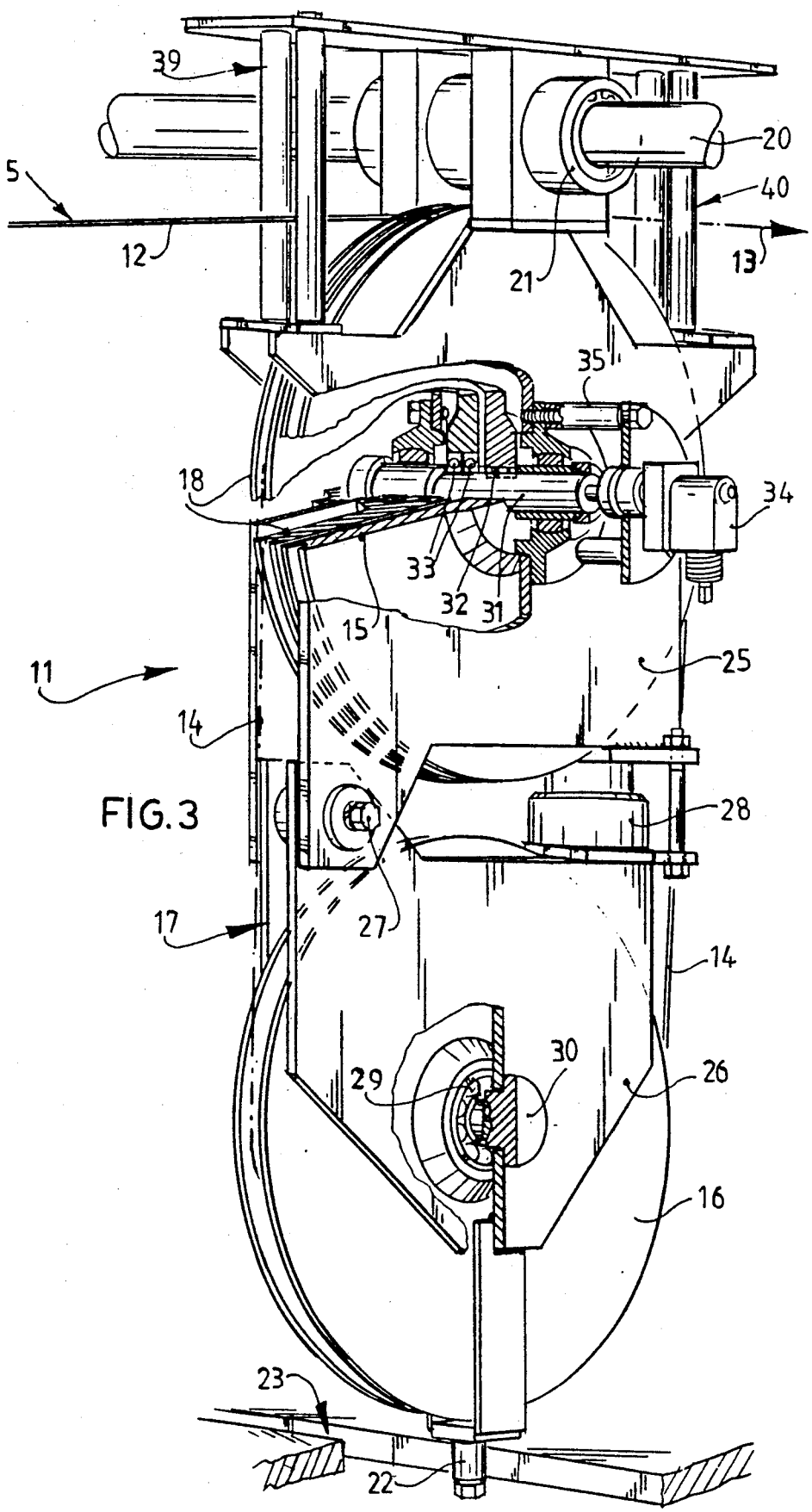
FIG. 3 is a partly broken away perspective view of the device according to the invention.

FIG. 3 shows in more detail the construction of the measuring device according to the invention.

The device comprises a frame 17 slidable at its top end by means of a slide bearing 21 in the direction transversely of the wire 5 over the rod 20 mounted fixedly in the winch device 1. At its bottom the frame bears a pin 22 which protrudes into a lengthwise groove 23. During operation of the winch device the whole measuring carriage is moved reciprocally in transverse direction of the wire 5 in order to follow the winding onto the winchdrum 4.

The frame 17 bears on the approach side two guide rollers 39 and on the outgoing side two guide rollers 40 which ensure that the incoming part 12 and the outgoing part 13 respectively move at a tangent relative to the first wheel 15 and the third wheel 18.

The frame 17 comprises an upper frame part 25 that carries the above mentioned bearing 21 and a lower frame part 26. This latter is connected to the upper frame part 25, on one side by means of a pivot joint 27 and on the other side by means of a force measurement box 28.

In the shown embodiment of the device according to the invention the first wheel 15 and the third wheel 18 are coaxial, closely adjacent to one another and mounted for independent rotation on a shaft 31. The first wheel 15 is fixedly connected to the shaft 31 by means of a key 32. The shaft 31 is rotatably mounted in the frame part 25. The third wheel 18 is rotatably mounted on the shaft 31 by means of a bearing construction 33. The wheels 15 and 18 can thus rotate independently of one another.

The second wheel 16 is mounted by means of a bearing 29 on a shaft 30 fixedly connected to the lower frame part 26.

As shown in the figures the wheels 15, 16 and 18 are provided on the periphery with guiding grooves for accurate guiding of the winch wire.

As FIG. 3 clearly shows, the winch wire extends on one side virtually at a tangent to the first and second wheel and on the other side at a tangent to the second and third wheel. So that the winch wire extends accurately at the said tangents the second wheel 16 can be mounted at a small angle relative to the first and third wheel. It has been found in practice that when the first and third wheel 15, 18 are mounted closely adjacent to one another in the manner shown a parallel assembly of the wheels can suffice.

A change in the tensile force in the winch wire 5 transmits itself immediately to the wire portion 14 in the loop. This is easiest seen when one imagines that the winch drum 4 is stationary and that a variable tensile force is applied to the outgoing part 13 of the wire. The loop portion 14 of this wire can immediately follow this tensile force because the inherent lengthening as a result of the elastic stretch can take place through a (small) relative turning of the first and third wheel 15, 18.

The force exerted on the wheel 16 in upward direction by the two intermediate parts of the loop portion 14 of the winch wire is transmitted via the bearing 29, the shaft 30 onto the lower frame part 26. The reaction force on the wheels 15 and 18 acts via the shaft 31 on the upper frame part 25. Because of the pivot construction 27 this play of forces on the upper and lower frame parts 25 and 26 results in a pressure on the measurement box 28. It is easily appreciated that the force detected by the measurement box 2 is proportional to the tensile force in the winch wire. The proportionality factor can be calculated simply on the basis of geometric considerations or be determined by calibration.

In addition to determining the tensile force in the winch wire the measuring device according to the invention is also used for determining the paid-out wire length. This is carried out using a tachometer sensor 34 connected to the frame 17 by a support construction 35 and coupled to the shaft 31. This sensor thus detects the revolutions of the first wheel 15. This wheel 15 has a very accurately finished periphery so that there exists an accurately determined relationship between the revolutions of wheel 15 and the paid-out length of winch wire. The measuring art with which the signal from the tachometer sensor 35 is converted into a length indication is per se known and is not further described here. In addition to the length indication a speed indication can of course be obtained at the same time so that the speed at which the wire 5 is paid out or drawn in can be indicated.

As shown in FIG. 3 the wheels 15, 16 and 18 preferably have the same diameter. As a result there occurs a simple relation between the tensile force and the force with which the wheels are constrained towards each other as a consequence thereof. The diameter of the wheels will moreover preferably be chosen as large as possible in order to keep the fatigue load of the winch wire 5 as low as possible. As a result of the disposition of the wheels shown the wire 5 is curved in only one direction during passage through the device and does not undergo an alternating stress, so that the useful life of the wire is minimally affected by unfavourable influences.

What is claimed is:

1. Device for measuring at least the tensile force in a winch wire comprising a frame, a first wheel rotatably mounted on said frame and a second wheel rotatably mounted on said frame such that said first and second wheel have at lest one common tangent, and whereby said winch wire can be trained in one loop about said wheels and extends between them on one side according to said common tangent, and means connected to said frame for measuring the force constraining said first and second wheel towards one another caused by the tensile force in said winch wire, characterized in that on said frame a third wheel is rotatably mounted such that this has a common tangent with said second wheel on the side thereof facing away from the first mentioned tangent and whereby said winch wire is trained over said first wheel, according to the first mentioned tangent to said second wheel and therefrom according to the second tangent to said third wheel and thereover, with one of said first wheel and said third wheel being operatively associated with a tachometer.

2. Device as claimed in claim 1, characterized in that the first and third wheel are mounted coaxially closely adjacent to one another and independently rotatable.

3. Device as claimed in claim 2, characterized in that of the first and third wheel, only one is fixedly connected to a shaft rotatably mounted on the frame, and that the other wheel is mounted rotatably on this shaft.

4. Device as claimed in claim 3, characterized in that said tachometer is coupled to said shaft.

5. Device as claimed in claim 2 characterized in that all wheels have the same effective diameter.

6. Device for measuring at least the tensile force in a winch wire comprising a frame, a first wheel rotatably mounted on said frame and a second wheel rotatably mounted on said frame such that said first and second wheel have at least one common tangent, and whereby said winch wire can be trained in one loop about said wheels and extends between them on one side according to said common tangent, and means connected to said frame for measuring the force constraining said first and second wheel towards one another caused by the tensile force in said winch wire, characterized in that on said frame a third wheel is rotatably mounted such that this has a common tangent with said second wheel on the side thereof facing away from the first mentioned tangent and whereby said winch wire is trained over said first wheel, according to the first mentioned tangent to said second wheel and therefrom according to the second tangent to said third wheel and thereover, with said first and third wheel mounted coaxially closely adjacent to one another and independently rotatable, and of the first and third wheel, only one is fixedly connected to a shaft rotatably mounted on the frame, and that the other wheel is mounted rotatably on this shaft.

7. The device according to claim 6 characterized in that a tachometer is coupled to said shaft.

8. The device as claimed in claim 7 characterized in that all wheels have the same effective diameter.

9. The device as claimed in claim 6 characterized in that all wheels have the same effective diameter.

* * * * *